No. 779,092.   Patented January 3, 1905.

UNITED STATES PATENT OFFICE.

WALTER MILLS, OF LONDON, ENGLAND, ASSIGNOR TO A. O. GRANGER, OF CARTERSVILLE, GEORGIA.

PROCESS OF MAKING LEAD SILICOFLUORID.

SPECIFICATION forming part of Letters Patent No. 779,092, dated January 3, 1905.

Application filed August 27, 1903. Serial No. 170,939.

*To all whom it may concern:*

Be it known that I, WALTER MILLS, a subject of the King of England, residing in London, England, have invented certain new and useful Improvements in Processes of Making Lead Silicofluorid, of which the following is a specification.

The present process of making lead silicofluorid is especially suited for the manufacture of such compound on a large or commercial scale and is based upon the fact that litharge, oxid of lead, and other oxygen-carrying compounds of lead are readily attached and dissolved by hydrofluosilicic acid, particularly when the acid is sufficiently concentrated and when the concentrated acid is heated.

In carrying out the present process I prefer to first prepare a somewhat hydrated oxid of lead by grinding the substance to fine powder and then soaking the same in water for some time. Instead of this partially-hydrated oxid a fully-hydrated basic oxid of lead may be employed. I find in practice that when ground litharge is stirred into an aqueous solution of hydrofluosilicic acid containing about twenty-five per cent. of theoretical acid at a temperature of about 90° centigrade a reaction takes place, which is indicated by the equation $$PbO + H_2SiF_6 = PbSiF_6 + H_2O.$$

If a basic hydroxid of lead is substituted for litharge, the same reaction takes place, but it is not so energetic. Thus, for example, when nitrate of lead is precipitated by aqueous ammonia a basic hydroxid is obtained which is well adapted for my purpose. The composition of this basic hydroxid varies considerably; but the quantity of theoretical oxid of lead present therein is readily calculated from the amount of ammonia used to obtain the precipitate. The proportions of the preceding equation will then apply. I may also substitute for litharge red oxid of lead in fine powder. I stir into it hot hydrofluosilicic acid in the manner already described. In this case dioxid of lead is precipitated in accordance with the equation $$Pb_3O_4 + 2H_2SiF_6 = 2PbSiF_6 + PbO_2 + 2H_2O.$$

Either of the substances aforesaid is then added with stirring to excess of hydrofluosilicic acid until the neutralization of the acid has been substantially effected, heat being used to accelerate the reaction. The product is then filtered and the solution of lead silicofluorid is ready for use, although if the salt is desired in a dry condition heat is applied and continued until the mass is substantially dry.

I find that such impurities as arsenic, bismuth, antimony, and ferric oxid, which are sometimes present in oxid of lead, are insoluble in hydrofluosilicic acid.

Having thus described my invention, I claim—

1. That process of making pure lead silicofluorid which consists in adding a hydrated oxygen-carrying compound of lead to excess of hydrofluosilicic acid, and in filtering the product to remove insoluble metallic compounds to obtain a solution of pure-lead silicofluorid.

2. That process of making pure silicofluorid which consists in adding an oxygen-carrying compound of lead to an excess of hydrofluosilicic acid; in stirring the mass during the addition of the compound; in applying heat to accelerate the reaction; in continuing the addition of the compound to the point of neutralization of the acid; and in filtering the product to remove insoluble metallic compounds to obtain a solution of pure-lead silicofluorid.

Signed this 26th day of August, 1903, at Nos. 9 to 15 Murray street, New York, N. Y.

WALTER MILLS.

Witnesses:
PIERSON L. WELLS,
JOHN O. SEIFERT.